US006959964B1

(12) United States Patent
Zapf

(10) Patent No.: US 6,959,964 B1
(45) Date of Patent: Nov. 1, 2005

(54) PORTABLE BACKREST STRUCTURE

(76) Inventor: Otto Zapf, Herzog-Adolph-Strasse 2, 61462 Konigstein (DE)

( * ) Notice: Subject to any disclaimer, the term of this patent is extended or adjusted under 35 U.S.C. 154(b) by 0 days.

(21) Appl. No.: 10/897,722

(22) Filed: Jul. 23, 2004

(51) Int. Cl.$^7$ .............................................. A47C 7/02
(52) U.S. Cl. ............................. 297/230.14; 297/230.12
(58) Field of Search ...................... 297/230.14, 230.13, 297/230.12, 230.1, 253, 452.46, 352, 284.5

(56) References Cited

U.S. PATENT DOCUMENTS

| 1,492,651 | A | * | 5/1924 | Rowley ...................... 297/253 |
| 1,999,560 | A | * | 4/1935 | Brueckl ...................... 297/253 |
| 2,528,412 | A | * | 10/1950 | Bickler ................... 297/230.11 |
| 2,663,359 | A | * | 12/1953 | Wood .......................... 297/253 |
| 2,833,341 | A | * | 5/1958 | Bornstein .................... 297/229 |
| 2,990,008 | A | * | 6/1961 | Bien .......................... 297/397 |
| 4,047,757 | A | * | 9/1977 | Eames et al. ........... 297/230.12 |
| D259,381 | S | * | 6/1981 | Smith .......................... D6/601 |
| 6,125,851 | A | * | 10/2000 | Walker et al. .............. 128/845 |
| 6,382,719 | B1 | * | 5/2002 | Heidmann et al. ........ 297/228.1 |
| 6,688,692 | B2 | * | 2/2004 | Phillips et al. .............. 297/337 |

* cited by examiner

Primary Examiner—Milton Nelson, Jr.
(74) Attorney, Agent, or Firm—Kirschstein, et al.

(57) ABSTRACT

A portable backrest structure includes a base section adjustably fitted onto a piece of seating furniture, and an upright section for elevating a pivot axis above a seat part of the furniture. The backrest structure is easily movable to and installed on another piece of furniture.

10 Claims, 4 Drawing Sheets

PORTABLE BACKREST STRUCTURE

BACKGROUND OF THE INVENTION

1. Field of the Invention

The present invention generally relates to a backrest structure and, more particularly, to a portable backrest structure for ready mounting on, and ready removal from, a piece of seating furniture.

2. Description of the Related Art

Many different backrest structures have been proposed in the art for increasing the comfort of a seated occupant. For example, see my U.S. Pat. No. 5,018,791; No. 5,649,739; and No. 6,435,615. As advantageous as these backrest structure are in reliably supporting the occupant, they are either permanently installed within a piece of furniture to render them non-portable, or if portable, they shift undesirably during use.

SUMMARY OF THE INVENTION

Objects of the Invention

Accordingly, it is a general object of this invention to advance the state of the art of furniture backrests.

More particularly, it is an object of the present invention to provide a portable, comfortable and durable backrest.

Still another object of the present invention is to enable a portable backrest to be reliably anchored in position during use.

Features of the Invention

In keeping with the above objects and others which will become apparent hereinafter, one feature of the present invention resides, briefly stated, in a backrest structure for ready mounting on, and ready removal from, a piece of seating furniture having a seat part and a backrest part. The backrest structure comprises a backrest having an upper backrest portion and a lower backrest portion in a supporting relationship with the upper back and the lower back, respectively, of an occupant seated on the furniture. The upper and lower backrest portions meet at a junction.

In accordance with this invention, the backrest structure further comprises a support including an upright section for mounting the backrest at the junction in front of the backrest part for pivoting movement about a pivot axis, and a base section slidable between the seat part and the backrest part to a mounted position in which the support is secured in place on the furniture during use. The base section is slidably removable from the mounted position to enable the backrest structure to be moved to another piece of seating furniture.

In one embodiment, the base section and the upright section are integrally formed of a bent or bendable rigid material. In another embodiment, the base section and the upright section are hinged together for movement between a plurality of angular positions.

It is preferred if the support includes a resilient spacer at the junction between the upright section and the backrest, and a threaded element extends through the upright section and the spacer, but terminates short of an outer front surface of the backrest. The upright section preferably includes a pair of support bars axially spaced apart as considered along the pivot axis, and the base section is a planar plate.

Other modifications include providing friction-enhanced outer surfaces on the base section, providing a plurality of ventilation openings extending through the backrest, and providing a curved outer peripheral edge region on the backrest.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
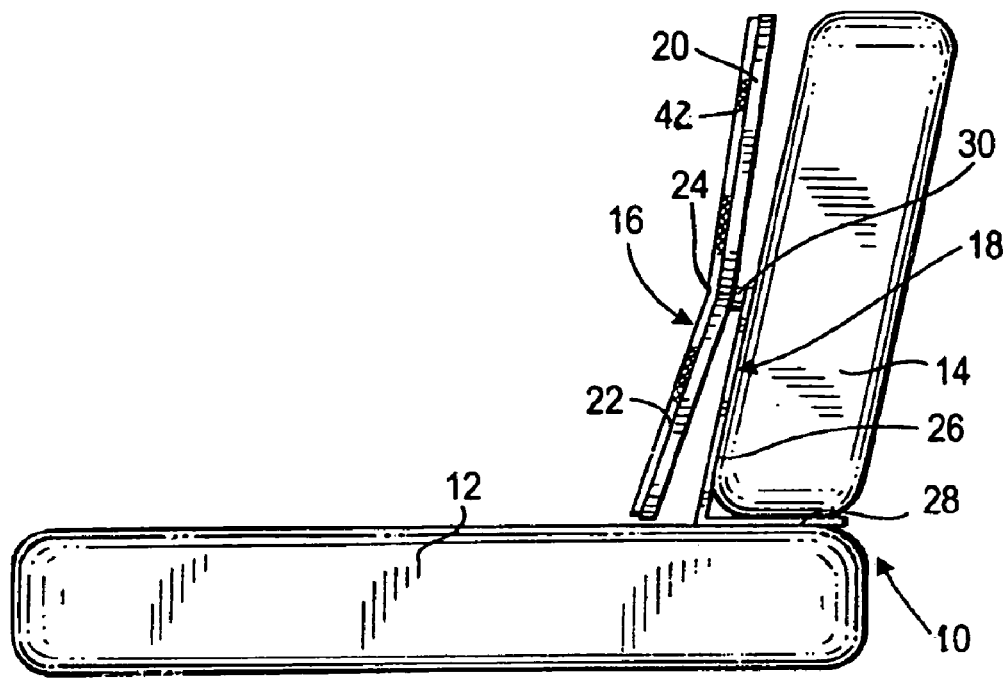
FIG. 1 is a side elevational view of one embodiment of a backrest structure in accordance with my invention.

Reference numeral 10 generally identifies a piece of seating furniture, for example, a chair or a seat in a moving vehicle, such as a car, truck, airplane, train, bus, or wheelchair, or a stationary chair or a seat, either indoors, such as an office or household chair, sofa or lounge, or outdoors, such as a bench or concert hall, theater, or arena seating. Each such piece of furniture 10 includes a seat part 12 and a backrest part 14.

In accordance with this invention, a backrest structure is mounted on the furniture for ready attachment thereon, and for ready removal therefrom to enable the backrest structure to be rapidly and easily installed and moved to another piece of furniture. In the embodiment of FIG. 1, the backrest structure includes a backrest 16 and a support 18 for mounting the backrest 16 on the furniture.

More specifically, the backrest 16 includes an upper backrest portion 20 in a supporting relationship with an upper back of an occupant seated on the furniture, and a lower backrest portion 22 in a supporting relationship with a lower back of the seated occupant. The backrest portions 20, 22 are constituted of a rigid material, e.g., wood, plastic, or metal, and in the embodiment of FIG. 1, are generally planar, lie in respective planes that include an obtuse angle, and meet at and along a linear junction 24.

Figure 3:
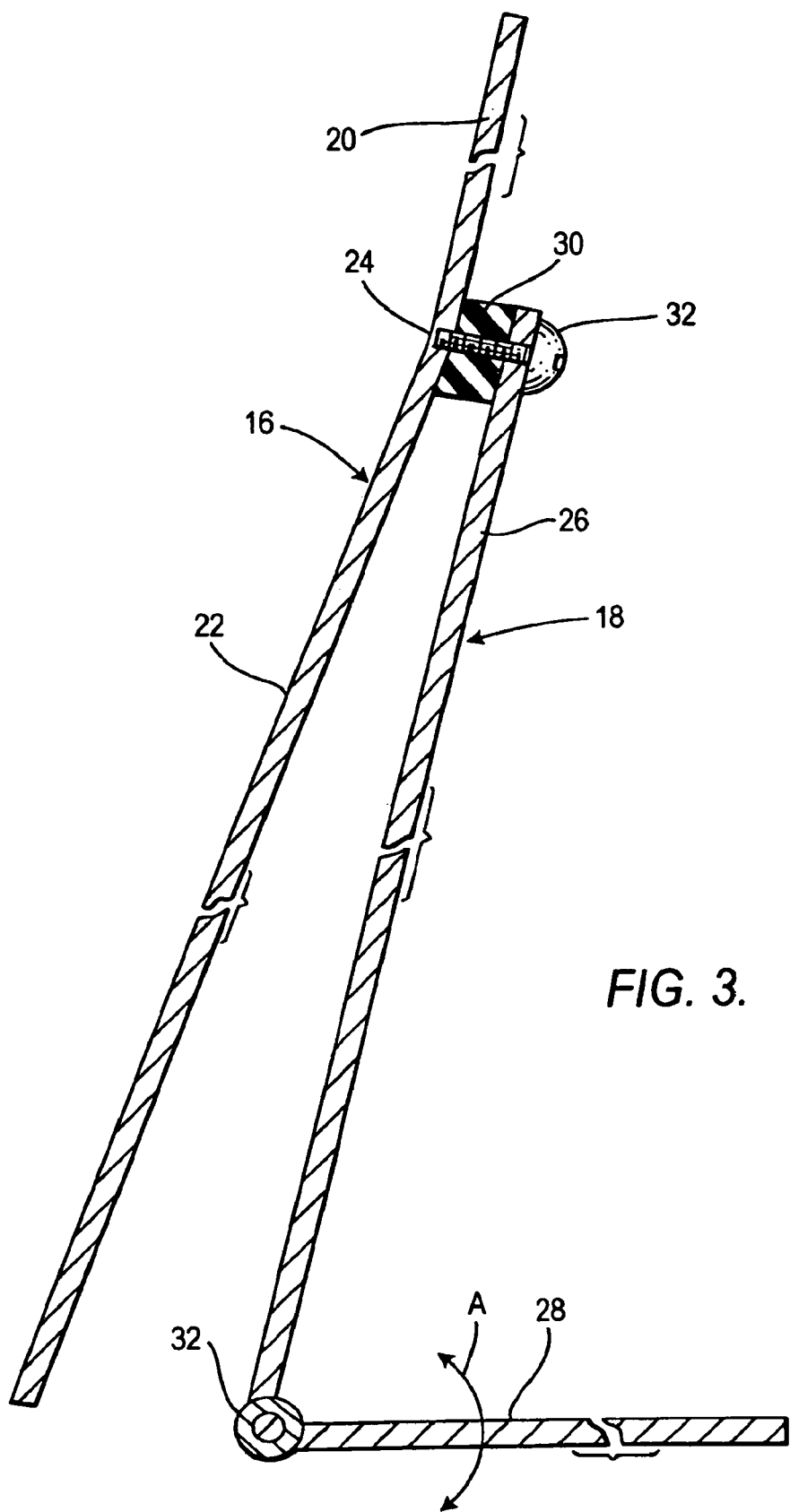
FIG. 3 is an enlarged, broken-away, sectional view of the backrest structure of FIG. 2.

The support 18 includes an upright section 26 and a base section 28. The base section 28 is slidable into a horizontal space formed between the backrest part 14 and the seat part 12 to a mounted position, as shown in FIG. 1, in which the support is secured in place on the furniture. The upright section 26 extends upwardly from the base section 28 and, as seen in the enlarged view of FIG. 3, a resilient spacer 30 is mounted on an upper end of the upright section 26 with the aid of a threaded fastener 32. The fastener 32 extends through the upright section and the spacer and into the backrest 16 as the junction 24, but preferably does not extend past the backrest. The backrest 16 is thus mounted on the upright section 26 for pivoting movement about a pivot axis extending along the junction 24. The backrest 16 is elevated above the seat part 12 and in front of the backrest part 14.

In use, when a person sits on the furniture and pushes the upper backrest portion 20 with his or her upper back rearwardly towards the backrest part 14, the lower backrest portion 22 is pivoted away from the backrest part 14 and into a more firm supporting relationship with the lower back of the occupant, thereby increasing the occupant's comfort. Similarly, when the occupant pushes against the lower backrest portion, the upper backrest portion 20 is pivoted fowardly to better support the occupant's upper back.

The spacer 30 can be constituted of rubber or plastic. The upright and base sections can be made of any rigid material, such as wood, plastic or metal. The base section 28 is shaped as a plate, and the upright section can likewise be a plate, or a pair of parallel bars, as discussed below in connection with FIG. 5.

Figure 2:
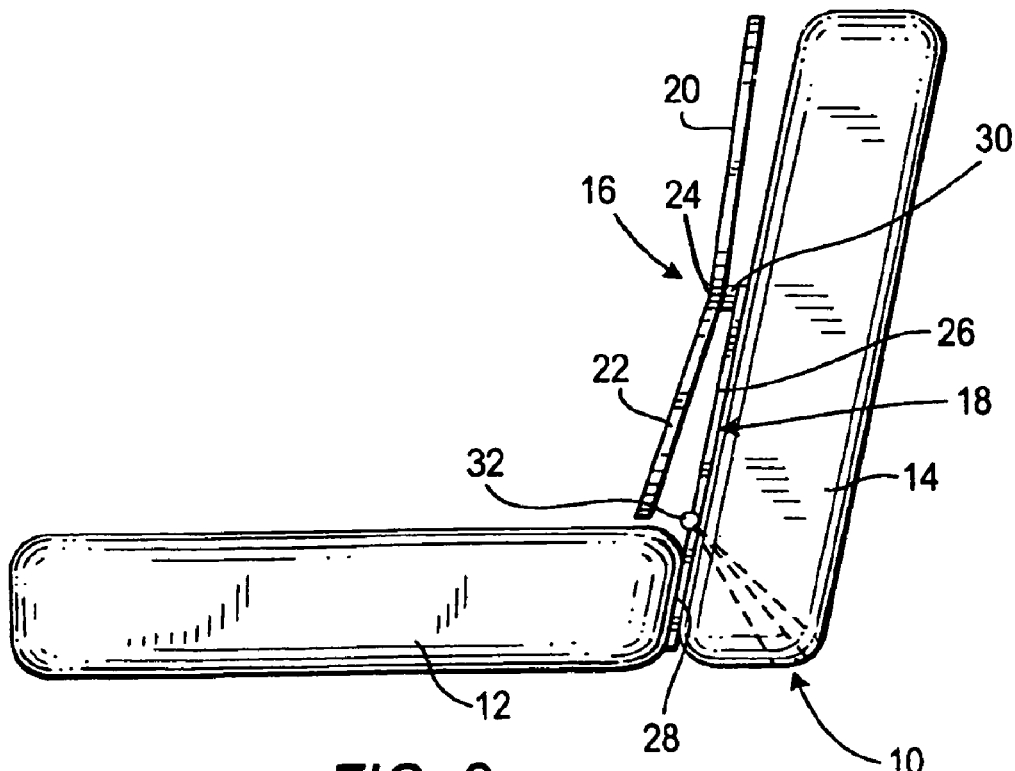
FIG. 2 is a side elevational view of another embodiment of the backrest structure.

In the FIG. 1 embodiment, the upright and base sections are of one-piece bent material construction, pre-formed into an L-shape. The material of the upright and base sections could also be deformable so as to be bent in place to fit onto the furniture. FIG. 2 shows a preferred modification in which a hinge 32 (see FIG. 3 for an enlarged view) is located between the upright and base sections in order to pivot the base section 28 in either direction of the illustrated arrows A in order to fit onto the furniture. Thus, as shown in FIG. 2, the base section 28 is extended to form a straight angle with the upright section in order to slide into a vertical space between the seat part 12 and the backrest part 14. The dashed lines in FIG. 2 depict other possible angles and planes in which the base section can be adjustably turned in order to fit into the configurations of different furniture.

Figure 4:
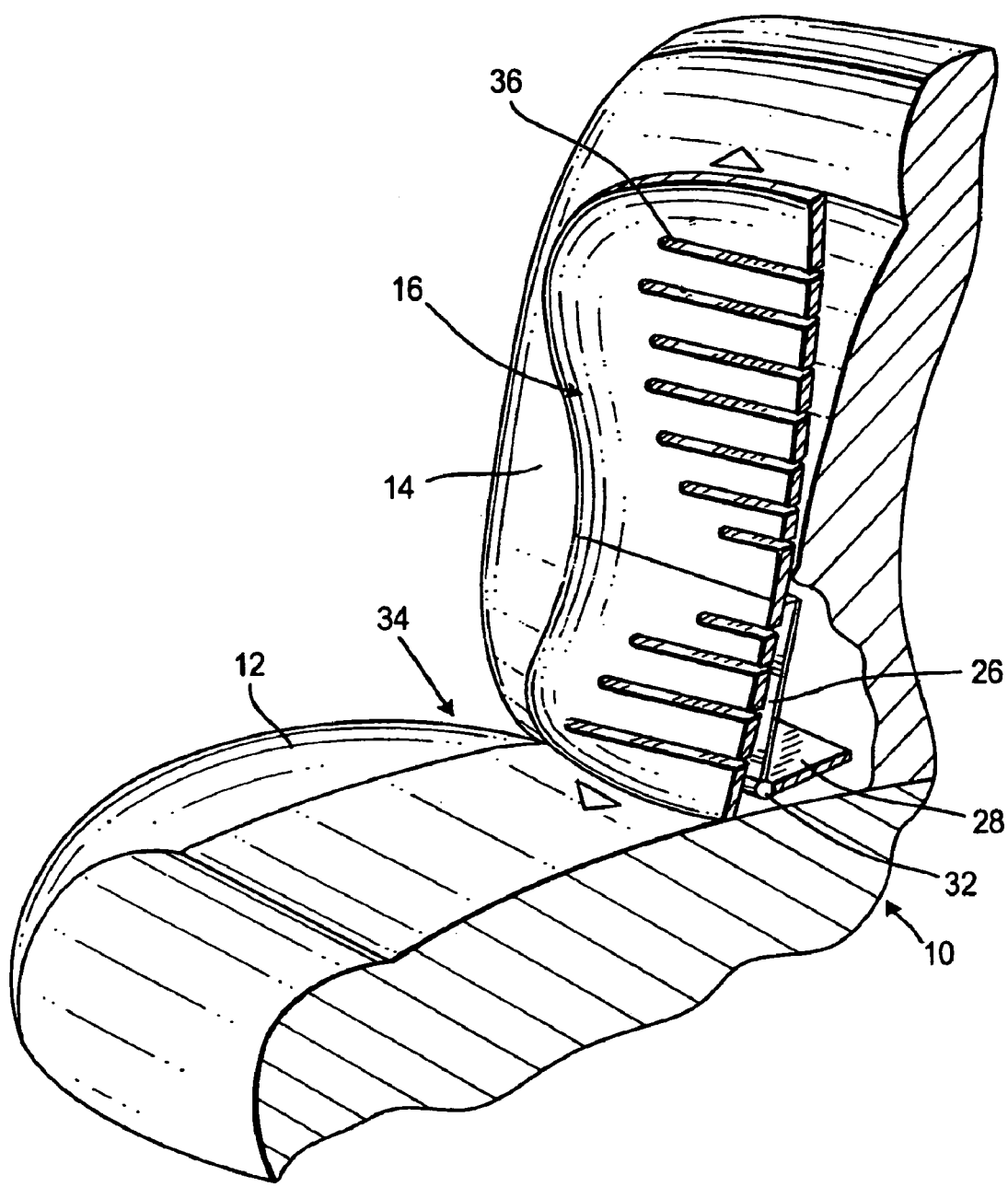
FIG. 4 is a broken-away, perspective view of the backrest structure of FIG. 2 in a mounted position on a piece of furniture.

FIG. 4 depicts an automotive seat 34 on which the backrest structure is mounted. It will be noted that a set of slots 36 are formed through the backrest 16 to provide ventilation and to reduce the weight of the backrest structure. It will also be noted that the outer peripheral region of the backrest 16 is curved to better conform to the occupant's back for increased comfort.

Figure 5:
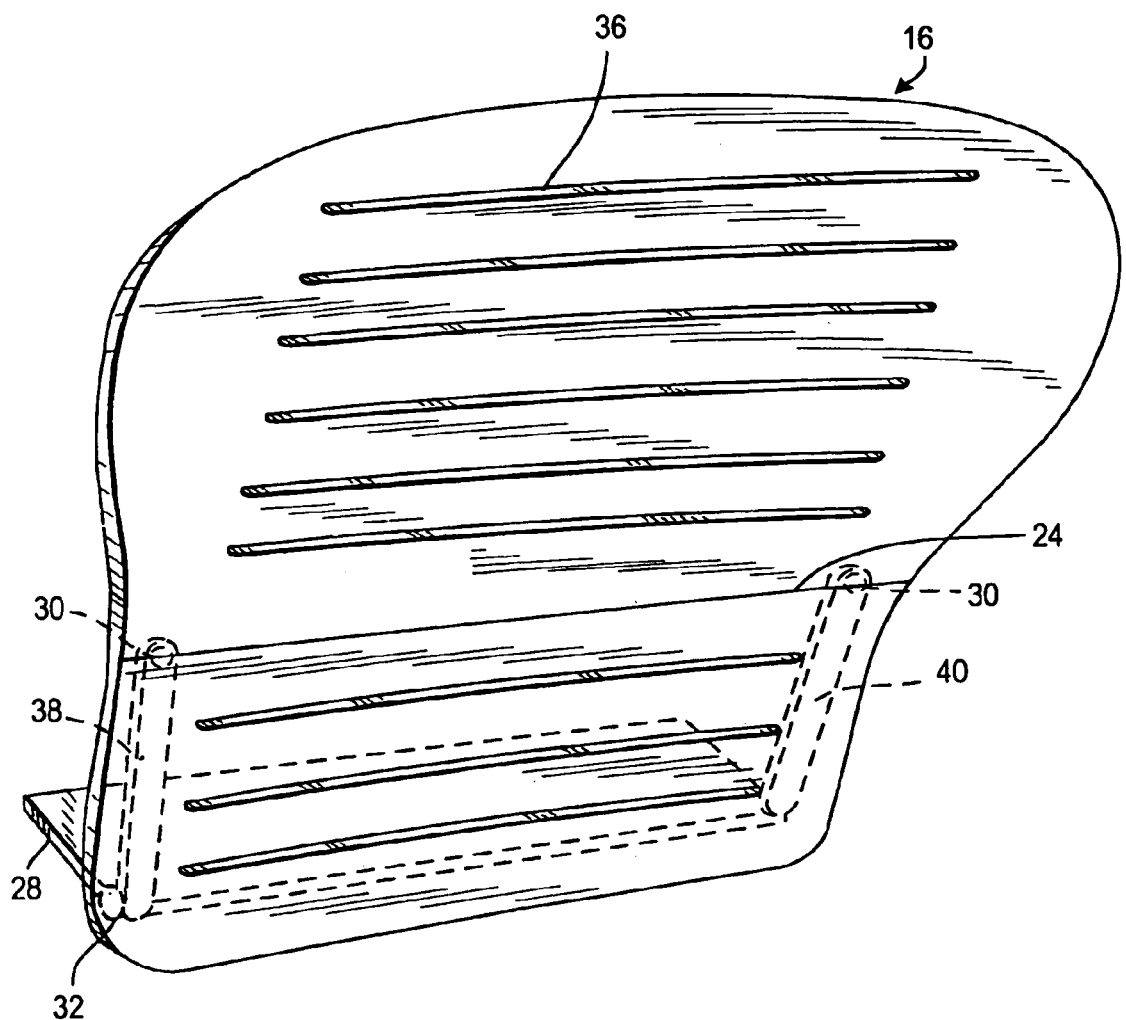
FIG. 5 is a perspective view of still another embodiment of a backrest structure.

FIG. 5 shows another modification in which the upright section comprises a pair of arms or bars 38, 40 spaced apart along the junction 24 and hinged at 32 to the plated-shaped base section 28. The base section 32 is preferably provided with friction enhancements, e.g., a roughened surface, or bumps, as represented by stippling, to enhance the frictional grip of the base section on the furniture. The base section is still easily slid to and removable from its mounted position to enable the backrest structure to be moved to another piece of furniture. The base section can be folded back against the upright section for compact storage.

In each embodiment herein, the support mounts the backrest without using means, such as straps, which wrap around the sides of the backrest part. This is especially beneficial in the case of modern car seats in which side air bags are deployed in the event of side collision from the sides of the backrest part. None of the embodiments of this invention prevent such deployment.

Other modifications include providing padding 42 (FIG. 1) on the backrest for increased user comfort.

It will be understood that each of the elements described above, or two or more together, also may find a useful application in other types of constructions differing from the types described above.

While the invention has been illustrated and described as embodied in a portable backrest structure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A backrest structure for ready mounting on, and ready removal from, a piece of seating furniture having a seat part and a backrest part, the backrest structure comprising:
   a) a backrest having an upper backrest portion and a lower backrest portion, the upper and lower backrest portions meeting at an obtuse angle at a junction; and
   b) a support including an upright section for mounting the backrest away from the backrest part and the seat part for freedom of movement about the junction when pressure is applied to one of the backrest portions, and a base section slidable between the seat part and the backrest part to a mounted position in which the support is secured in place on the furniture during use, and the base section being slidably removable from the mounted position to enable the backrest structure to be moved to another piece of seating furniture.

2. The backrest structure of claim 1, wherein the base section and the upright section are integrally formed of a bent rigid material.

3. The backrest structure of claim 1, wherein the base section and the upright section are hinged together for movement between a plurality of angular positions.

4. The backrest structure of claim 1, wherein the support includes a resilient spacer at the junction between the upright section and the backrest.

5. The backrest structure of claim 4, wherein the support includes a threaded element extending through the upright section and the spacer, but terminating short of an outer front surface of the backrest.

6. The backrest structure of claim 1, wherein the upright section includes a pair of support arms axially spaced apart as considered along a pivot axis, and wherein the base section is a planar plate.

7. The backrest structure of claim 1, wherein the base section has friction-enhanced outer surfaces.

8. The backrest structure of claim 1, wherein the backrest has a plurality of ventilation openings extending therethrough.

9. The backrest structure of claim 1, wherein the backrest has a curved outer peripheral edge region.

10. The backrest structure of claim 1, wherein the backrest has a pad.

* * * * *